United States Patent
Patel et al.

(10) Patent No.: US 8,000,399 B2
(45) Date of Patent: Aug. 16, 2011

(54) ADAPTIVE JOINT CHANNEL ESTIMATION AND DATA DEMODULATION FOR OFDM SYSTEMS

(76) Inventors: Bhaskar Patel, San Clemente, CA (US); Arumugam Govindswamy, Irvine, CA (US)

( * ) Notice: Subject to any disclaimer, the term of this patent is extended or adjusted under 35 U.S.C. 154(b) by 673 days.

(21) Appl. No.: 12/157,791

(22) Filed: Jun. 13, 2008

(65) Prior Publication Data
US 2008/0310536 A1     Dec. 18, 2008

Related U.S. Application Data

(60) Provisional application No. 60/934,430, filed on Jun. 14, 2007.

(51) Int. Cl.
*H04K 1/10* (2006.01)
(52) U.S. Cl. .................................. 375/260; 375/350
(58) Field of Classification Search .................. 375/260, 375/340, 359, 346, 348, 285; 370/252
See application file for complete search history.

(56) References Cited

U.S. PATENT DOCUMENTS

2005/0213680 A1* 9/2005 Atungsiri et al. .............. 375/260
2011/0051618 A1* 3/2011 Li et al. .......................... 370/252

* cited by examiner

*Primary Examiner* — Emmanuel Bayard
(74) *Attorney, Agent, or Firm* — Lerner, David, Littenberg, Krumholz & Mentlik, LLP

(57) ABSTRACT

The present invention provides architectures and methods which implement adaptive joint channel estimation and data demodulation in wireless communication systems to provide enhanced performance of the communication link. While not limited to any particular air interface, such architectures and methods are particularly beneficial in OFDM systems. Channel estimates may be performed for pilot sub-carriers for a given OFDM symbol and filtering may then be performed for channel estimation of a given data subcarrier. Received symbols may be equalized and demodulated, and the channel estimate may be updated for the given data subcarrier. Such a procedure enables more accurate channel estimation and improved data demodulation, thereby enhancing system performance.

20 Claims, 14 Drawing Sheets

FIG. 12

| Sub-carrier for which the adaptive channel estimation is performed | Available channel estimates to perform the channel estimate |
|---|---|
| 6 | $\hat{h}_0, \hat{h}_4, \hat{h}_8, \hat{h}_{12}$ |
| 5 | $\hat{h}_0, \hat{h}_4, \hat{h}_6, \hat{h}_8, \hat{h}_{12}$ |
| 7 | $\hat{h}_0, \hat{h}_4, \hat{h}_5, \hat{h}_6, \hat{h}_8, \hat{h}_{12}$ |
| 4 | $\hat{h}_0, \hat{h}_4, \hat{h}_5, \hat{h}_6, \hat{h}_7, \hat{h}_8, \hat{h}_{12}$ |
| 8 | $\hat{h}_0, \hat{h}_4, \hat{h}_5, \hat{h}_6, \hat{h}_7, \hat{h}_8, \hat{h}_{12}$ |
| 3 | $\hat{h}_0, \hat{h}_4, \hat{h}_5, \hat{h}_6, \hat{h}_7, \hat{h}_8, \hat{h}_{12}$ |
| 9 | $\hat{h}_0, \hat{h}_3, \hat{h}_4, \hat{h}_5, \hat{h}_6, \hat{h}_7, \hat{h}_8, \hat{h}_{12}$ |
| 2 | $\hat{h}_0, \hat{h}_3, \hat{h}_4, \hat{h}_5, \hat{h}_6, \hat{h}_7, \hat{h}_8, \hat{h}_9, \hat{h}_{12}$ |
| 10 | $\hat{h}_0, \hat{h}_2, \hat{h}_3, \hat{h}_4, \hat{h}_5, \hat{h}_6, \hat{h}_7, \hat{h}_8, \hat{h}_9, \hat{h}_{12}$ |
| 1 | $\hat{h}_0, \hat{h}_2, \hat{h}_3, \hat{h}_4, \hat{h}_5, \hat{h}_6, \hat{h}_7, \hat{h}_8, \hat{h}_9, \hat{h}_{10}, \hat{h}_{12}$ |
| 11 | $\hat{h}_0, \hat{h}_1, \hat{h}_2, \hat{h}_3, \hat{h}_4, \hat{h}_5, \hat{h}_6, \hat{h}_7, \hat{h}_8, \hat{h}_9, \hat{h}_{10}, \hat{h}_{12}$ |
| 0 | $\hat{h}_0, \hat{h}_1, \hat{h}_2, \hat{h}_3, \hat{h}_4, \hat{h}_5, \hat{h}_6, \hat{h}_7, \hat{h}_8, \hat{h}_9, \hat{h}_{10}, \hat{h}_{11}, \hat{h}_{12}$ |
| 12 | $\hat{h}_0, \hat{h}_1, \hat{h}_2, \hat{h}_3, \hat{h}_4, \hat{h}_5, \hat{h}_6, \hat{h}_7, \hat{h}_8, \hat{h}_9, \hat{h}_{10}, \hat{h}_{11}, \hat{h}_{12}$ |
| 13 | $\hat{h}_0, \hat{h}_1, \hat{h}_2, \hat{h}_3, \hat{h}_4, \hat{h}_5, \hat{h}_6, \hat{h}_7, \hat{h}_8, \hat{h}_9, \hat{h}_{10}, \hat{h}_{11}, \hat{h}_{12}$ |

100

ADAPTIVE JOINT CHANNEL ESTIMATION AND DATA DEMODULATION FOR OFDM SYSTEMS

CROSS-REFERENCE TO RELATED APPLICATION

The present application claims the benefit of the filing date of U.S. Provisional Patent Application No. 60/934,430, filed Jun. 14, 2007, and entitled "Adaptive Joint Channel Estimation and Data Decoding for OFDM Systems," the entire disclosure of which is hereby expressly incorporated by reference herein.

FIELD OF THE INVENTION

The present invention relates generally to digital communication systems and, more particularly, to methods and receiver architectures for channel estimation and data demodulation.

BACKGROUND OF THE INVENTION

Quadrature Amplitude Modulation (QAM), Phase Shift Keying (PSK), Binary PSK (BPSK), and Quadrature PSK (QPSK) are some of the commonly used modulation techniques in digital communication systems. The set of all symbols and their arrangement in a modulation technique is referred as a "constellation."

In general, the reference phase and amplitude of the modulation constellation are required at the receiver to estimate the symbols sent by the transmitter. In general, the phase and amplitude of the constellation show random variations due to a variety of channel impairments such as fading, frequency response of the channel, frequency offset, timing offset, etc. In coherent detection, the reference phase and amplitude of the modulation constellation may be obtained from reference symbols that may be transmitted along with the data symbols. In non-coherent detection, previously detected symbols may be used as reference symbols for detecting current symbols. In general, coherent detection provides superior performance than non-coherent detection. The overhead in terms of the bandwidth and power allocated for transmitting reference symbols is justified by the improved performance. The process of estimating the phase and amplitude of the channel to demodulate the symbol received on the channel is referred to as channel estimation. The process of compensating the effect of the random phase and amplitude variation by using the estimated channel conditions is referred to as equalization.

Orthogonal frequency division multiplexing (OFDM) is a multi-carrier modulation scheme used in many digital communication systems. In OFDM, a large number of closely spaced orthogonal subcarriers are used to transmit data as shown in FIG. 1. The data are divided into several parallel data streams, one for each subcarrier. Each subcarrier is modulated with a conventional modulation scheme such as QAM, PSK, BPSK, or QPSK, at a low symbol rate while maintaining total data rate similar to single carrier modulation schemes in the same channel bandwidth. The frequency spacing between two adjacent subcarriers is referred as subcarrier spacing and it is denoted by $\Delta f$. The rate at which the individual subcarriers are modulated is referred as symbol rate. The collection of all the subcarriers is referred as an OFDM symbol. The OFDM symbol rate is the same as the data symbol rate on each individual subcarrier. The OFDM symbol duration is denoted by $T_u$. The OFDM signal is typically generated in frequency domain and then converted in time domain. An OFDM signal over one symbol duration is referred as an OFDM symbol in both time domain and frequency domain. Additional details about OFDM may be found in "3G Evolution: HSPA and LTE for Mobile Broadband" by Dahlman, Parkvall, Sköld and Beming, published by Academic Press, 1st Edition© 2007, the entire disclosure of which is hereby expressly incorporated by reference herein.

The primary advantage of OFDM over single carrier modulation schemes is its ability to cope with severe channel conditions such as attenuation of high frequencies in a channel, narrowband interference and frequency selective fading due to multipath without requiring complex equalization filters. Channel equalization is simplified because OFDM may be viewed as using many slowly modulated narrowband signals rather than one rapidly modulated wideband signal. The low symbol rate makes the use of a guard interval between OFDM symbols affordable, making it possible to handle time spreading and eliminate intersymbol interference (ISI).

Low complexity implementation by means of computationally efficient Fast Fourier Transform (FFT) is possible for OFDM due to its specific structure and the selection of a subcarrier spacing $\Delta f$ equal to the reciprocal of OFDM symbol rate $T_u$.

An uncorrupted OFDM signal can be demodulated without any interference between subcarriers. The subcarrier orthogonality is due to the fact that a modulated subcarrier consists of an integer number of periods of complex exponentials during the OFDM symbol interval $T_u=1/\Delta f$. However, in case of a time dispersive channel the orthogonality between the subcarriers may be lost. The reason for this loss of subcarrier orthogonality is that the OFDM symbol boundary for one path will overlap with the symbol boundary of a different path, as illustrated in FIG. 2. As a consequence, in case of a time dispersive channel there will be intersymbol interference within a subcarrier and interference between subcarriers.

Cyclic prefix insertion is typically used in OFDM to address the loss of orthogonality in time dispersive channels and to make an OFDM signal robust to time dispersion on the radio channel. As illustrated in FIG. 3, cyclic prefix insertion is performed by copying the last portion of the OFDM symbol and inserting it at the beginning of the OFDM symbol.

Cyclic prefix insertion is beneficial in the sense that it makes an OFDM signal robust to time dispersion as long as the span of the time dispersion does not exceed the length of the cyclic prefix. The drawback of cyclic prefix insertion is that only a fraction $T_u/(T_u+T_{CP})$ of the received signal power is actually utilized by the OFDM demodulator. Cyclic prefix insertion also reduces the OFDM symbol rate from $1/T_u$ to $1/(T_u+T_{CP})$.

At the receiver side, the samples corresponding to cyclic prefix are discarded before FFT processing. Assuming a sufficiently large cyclic prefix, the linear convolution of a time dispersive radio channel will appear as a circular convolution during the OFDM symbol interval $T_u$. The combination of OFDM modulation (Inverse FFT (IFFT) processing), a time dispersive radio channel, and OFDM demodulation (FFT processing) can then be seen as a frequency domain channel as illustrated in FIG. 4, where the frequency domain channel taps $h_0, \ldots, h_{N-1}$ can be directly derived from the channel impulse response, where N is the number of subcarriers used in an OFDM symbol.

The output $r_{n,k}$ of the $k^{th}$ subcarrier at the receiver in FIG. 4 is the transmitted modulation symbol $x_{n,k}$ scaled and phase rotated by the complex frequency domain channel tap $h_k$ and impaired by noise $n_k$. To properly recover the transmitted symbol for data demodulation and channel decoding, the receiver should multiply $r_{n,k}$ with the complex conjugate of estimated channel, $\hat{h}_k$, as illustrated in FIG. 5. This is often referred as a one tap frequency domain equalizer being applied to each received subcarrier.

To perform data demodulation, the receiver has to estimate the frequency domain channel taps $h_0, \ldots, h_{N-1}$. The frequency domain channel taps can be estimated by first estimating the channel impulse response and then converting it into frequency domain to estimate $h_0, \ldots, h_{N-1}$. However, frequency domain channel taps may be estimated directly by using known reference symbols, which are inserted by the transmitter at regular intervals within the OFDM time-frequency grid, as illustrated in FIG. 6. The reference symbols are often referred as pilot symbols. The subcarrier on which the pilot symbol is transmitted is referred as pilot subcarrier. The terms pilot, pilot subcarrier, and pilot symbol are used interchangeably herein.

Using a priori information about the reference symbols, the receiver can estimate the frequency domain channel around the location of the reference symbols. The reference symbols should have a sufficiently high density in both the time and the frequency dimensions to be able to provide estimates for the entire time-frequency grid in a variety of channel conditions including radio propagation channels subject to high frequency and/or time selectivity. Different algorithms may be used for the channel estimation, such as averaging, linear interpolation, Minimum Mean Square Error (MMSE) estimation, etc. Some of these algorithms may require knowledge of the channel statistics.

There are several traditional methods for performing channel estimation. One of the commonly used methods is the MMSE channel estimation. In this method the known channel estimates from the surrounding pilot positions are used to form a MMSE channel estimate for data subcarriers. The pilots may be used from past and present OFDM symbols. Pilots from future OFDM symbols may also be used if storage and delay are not issues in an application. FIG. 7 illustrates an example of the MMSE channel estimation that uses seven pilots that are closest to the data symbol for which the channel estimate is needed.

Let (n, m) denote a data symbol position on OFDM symbol number n and subcarrier m. In FIG. 7, the initial available channel estimates for estimating a channel at position (9, 7) are the ones at the set of pilot positions as follows:

Set_1={(4,5),(4,9),(8,4),(8,8),(8,12),(12,7),(12,11)}

Using the channel estimates at the above positions a two dimensional (2D) channel estimate is performed using a filter whose coefficients are computed according to MMSE criteria using the joint time and frequency correlation of the propagation channel. For example, to compute the channel estimate at data symbol position (9, 7) the coefficient that multiplies the pilot channel estimate at position (4, 5) is proportional to the channel correlation between the position of the pilot (4, 5) and the position of the data symbol (9, 7) whose channel estimate is desired. Similarly, the filter coefficient that multiplies the pilot channel estimate at position (8, 8) is proportional to the channel correlation between the position of the pilot (8, 8) and the position of the data symbol (9, 7) whose channel estimate is desired. For correlated propagation channels clearly there is a stronger channel correlation between positions (8, 8) and (9, 7) compared to correlation between positions (4, 5) and (9, 7). Therefore, depending on signal conditions, typically the pilot channel estimate at position (8, 8) is emphasized heavily in the channel estimation for position (9, 7). For each position within the 2D time-frequency grid, there will be a different set of filter coefficients. However, since the pilot pattern is repetitive, after four OFDM symbols, the same set of filter coefficients will be needed.

The above described MMSE channel estimation method uses pilots from different OFDM symbols and from different subcarriers in those OFDM symbols and therefore it is referred herein as 2D MMSE channel estimation. The 2D MMSE exploits the channel correlation that is typically present along both the time axis and the frequency axis. This type of MMSE estimation is often too complex and therefore lower complexity versions that provide performance close to that of a 2D MMSE estimation are developed in literature. Separable 2D MMSE estimation is one example of commonly used lower complexity channel estimation method. In this method, first the MMSE estimation is performed in one dimension based on the channel correlation in that dimension and then second MMSE is performed in another dimension which in turn exploits the correlation in that dimension.

The channel correlation along the time and frequency axis can be estimated based on the propagation channel models. Often the time and frequency correlation of the channel can be treated independently and therefore the channel estimation methods that exploit the channel correlation can also be separated. FIG. 8 illustrates an example of a separable 2D channel estimation procedure where 1D filtering is performed along time axis first and then the next 1D filtering is performed along frequency axis. The pilot symbols used in 1D filters along each axis is limited to the pilots available along the axis for which the filtering is being performed. FIG. 9 illustrates the pilots available for 1D filtering along the frequency axis.

There is a tradeoff between the density of pilots and the overhead in terms of portion of the total bandwidth and portion of the total power used up by the reference symbols such as pilots or training symbols. Although greater density of pilots is desirable for improved channel estimation, it takes away portion of the total bandwidth and portion of the total power that could otherwise be used for payload data transmission.

Mobile wireless communication systems operate under very dynamic propagation channel conditions. The propagation channel conditions between the transmitter and the receiver can vary rapidly because of the fast movement of the mobile terminals. Normally in mobile wireless communication systems a larger number of reference symbols are embedded in the transmitted signal to enable receivers to reliably estimate the rapidly varying channel conditions.

Once a communication system is designed with specified reference symbols information, the channel estimation methods in the receiver must be designed to take full advantage of the available reference symbols embedded in the transmitted signal.

In order to reduce the overhead of the reference symbols, some communication systems transmit the reference symbols at the beginning of a connection and then switch to payload data transmission. In this type of scenario, the receiver uses the initial reference (training) symbols to estimate the channel and then use this estimated channel for equalizing data symbols received during payload data transmission mode.

In many communication systems the channel varies over a period of time. Therefore it is necessary for the receiver to continuously track the changes in the channel and adapt the estimated channel. A common approach to track the channel variation is to use the demodulated data symbols as reference symbols for estimating the channel for the next symbol. This is often referred as Decision Directed Channel Estimation or Decision Feedback Equalization (DFE). The DFE uses the previously demodulated and/or decoded data symbols for estimating the channel for the present data symbol.

In OFDM systems, each OFDM symbol consists of a large number of subcarriers that are individually modulated. Some of these subcarriers may be designated as pilots and the modulation information for those subcarriers may be known a priori. In the absence of pilots in the present symbols, the demodulated data symbols from previous OFDM symbol may be used for estimating channel for the present symbol.

While such channel estimation techniques may provide an acceptable level of performance, it is desirable to provide improved channel estimation performance while reducing or keeping the same overhead in terms of bandwidth and power allocated to reference symbols. This is especially significant for receivers in highly mobile propagation environment.

SUMMARY OF THE INVENTION

In accordance with an embodiment of the present invention, a channel estimation and data demodulation method for use in a wireless communication system is provided. The method comprises performing a first channel estimate for pilot subcarriers of a current symbol; performing filtering along the time dimension to obtain the channel estimate for the pilot subcarriers using channel estimates at pilot positions of one or more past symbols; performing filtering along the frequency dimension to obtain a second channel estimate for a data symbol of a selected data subcarrier using known channel estimates; equalizing the data symbol of the selected data subcarrier; demodulating the equalized data symbol to estimate a transmitted symbol on the selected data subcarrier; and adapting the second channel estimate on the selected data subcarrier using the estimated transmitted symbol so that the adapted channel estimate and any other previously known channel estimates form a basis to perform channel estimation of a next data subcarrier.

In one example, the current and past symbols are OFDM symbols. In another example, the step of performing the first channel estimate is done by dividing a received value $r_{n,p}$ on a pilot subcarrier position $\{p\}$ with a known transmitted modulation data symbol $x_{n,p}$. In this case, the first channel estimate may be performed with a least squares estimate $\hat{h}_{n,p}$ according to the following equation:

$$\hat{h}_{n,p} = \frac{r_{n,p}}{x_{n,p}}.$$

In another example, the filtering along the time dimension obtains the channel estimates at the pilot positions according to the following equation:

$$\hat{h}_{n,p} = \sum_{t=1}^{L_t} C_{t,p} \hat{h}_{t,p}$$

wherein p represents pilot position, n represents a current symbol, $L_t$ represents a number of past symbols used for the one dimensional filtering action and $C_{t,p}$ are coefficients for the one dimensional filtering action along the time dimension. Such coefficients may be obtained using one or more different criteria, such as MMSE, Wiener filtering, etc.

In a further example, the second channel estimate is obtained according to the following equation:

$$\hat{h}_{n,d} = \sum_{j=1}^{L_{f,d}} C_{f,j} \hat{h}_{n,j}$$

wherein n represents a current symbol, $L_{f,d}$ represents a number of available known channel estimates, and $C_{f,j}$ are coefficients for filtering along the frequency dimension. As above, such coefficients may be obtained using criteria such as MMSE, Wiener filtering, etc.

In another example, equalizing the data symbol is performed according to the following equation:

$$y_{n,d} = \hat{h}^*_{n,d} r_{n,d}$$

wherein the received equalized data symbol $y_{n,d}$ is equal to the complex conjugate of the channel estimate multiplied by the output of the $d^{th}$ subcarrier.

In a further example, adapting the second channel estimate on the selected data subcarrier using the estimated transmitted symbol is done by performing a least squares channel estimate. In this case, the least squares channel estimate may be performed according to the following equation:

$$\hat{h}_{n,d} = \frac{r_{n,d}}{\hat{x}_{n,d}}$$

wherein $\hat{h}_{n,d}$ is a channel estimate, $r_{n,d}$ is an output of the $d^{th}$ subcarrier, and $\hat{x}_{n,d}$ is a demodulated data symbol.

In yet another example, two dimensional filtering along both the time and frequency dimensions is performed. And in a further example, the selected data subcarrier is chosen so that it is surrounded by pilot subcarriers of the current symbol.

In accordance with another embodiment of the present invention, a recording medium is recorded with a computer program for execution by a processor to perform a channel estimation and data demodulation process in a wireless communication system. The process comprises performing a first channel estimate for pilot subcarriers of a current symbol; performing filtering along the time dimension to obtain the channel estimate for the pilot subcarriers using channel estimates at pilot positions of one or more past symbols; performing filtering along the frequency dimension to obtain a second channel estimate for a data symbol of a selected data subcarrier using known channel estimates; equalizing the data symbol of the selected data subcarrier; demodulating the equalized data symbol to estimate a transmitted symbol on the selected data subcarrier; and adapting the second channel estimate on the selected data subcarrier using the estimated transmitted symbol so that the adapted channel estimate and any other previously known channel estimates form a basis to perform channel estimation of a next data subcarrier.

In one alternative, the current and past symbols are OFDM symbols. In another alternative, the selected data subcarrier is chosen so that it is surrounded by pilot subcarriers of the current symbol. In a further alternative, the filtering is a two dimensional filtering action.

In accordance with a further embodiment of the present invention, a wireless communication device for use on a wireless communication network is provided. The wireless communication device comprises a baseband subsystem including a processor for managing operations of the wireless communication device and a radio frequency subsystem operatively connected to the baseband subsystem. The radio frequency subsystem includes at least one receive chain being operable to receive signals from at least one channels of the wireless communication network. The processor is operable to perform a first channel estimate for pilot subcarriers of a current symbol received by at least one receive chain; perform filtering along the time dimension to obtain the channel estimate for the pilot subcarriers using channel estimates at pilot positions of one or more past symbols; perform filtering along the frequency dimension to obtain a second channel estimate for a data symbol of a selected data subcarrier using known channel estimates; equalize the data symbol of the selected data subcarrier; demodulate the equalized data symbol to estimate a transmitted symbol on the selected data subcarrier; and adapt the second channel estimate on the selected data subcarrier using the estimated transmitted symbol so that the adapted channel estimate and any other previously known channel estimates form a basis to perform channel estimation of a next data subcarrier.

In one alternative, the wireless communication network employs an OFDM modulation scheme. In another alternative, the selected data subcarrier is chosen so that it is surrounded by pilot subcarriers of the current symbol. In a further alternative, the device is a mobile station. And in yet another alternative, the device is a base station of the wireless communication network.

BRIEF DESCRIPTION OF THE DRAWINGS

FIG. 12 illustrates a sequence of steps according to an adaptive channel estimation method of the present invention when applied to a cluster of an IEEE 802.16e based OFDM system.

DETAILED DESCRIPTION

Figure 1:
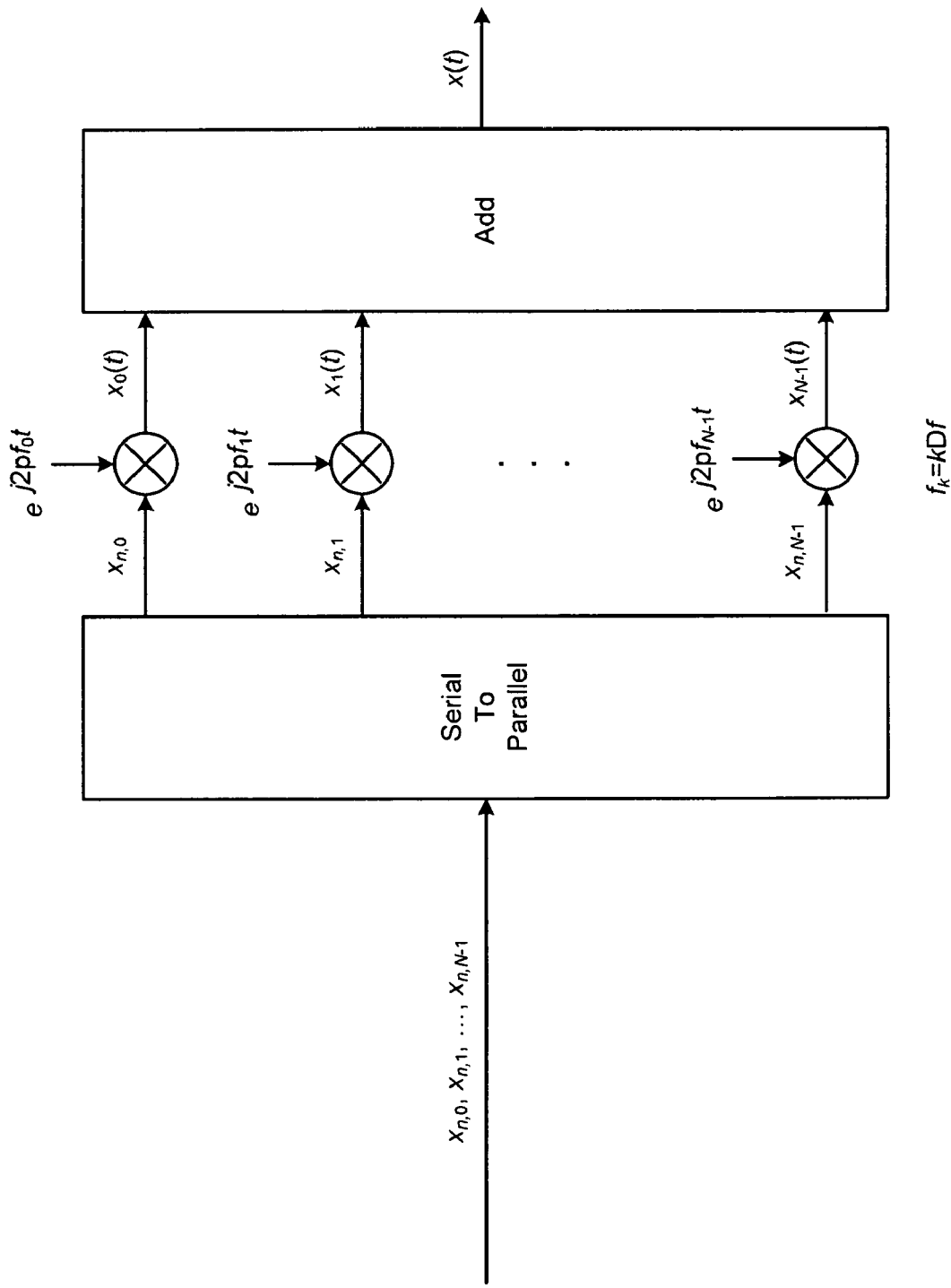
FIG. 1 illustrates a conventional OFDM communication system.
Figure 2:
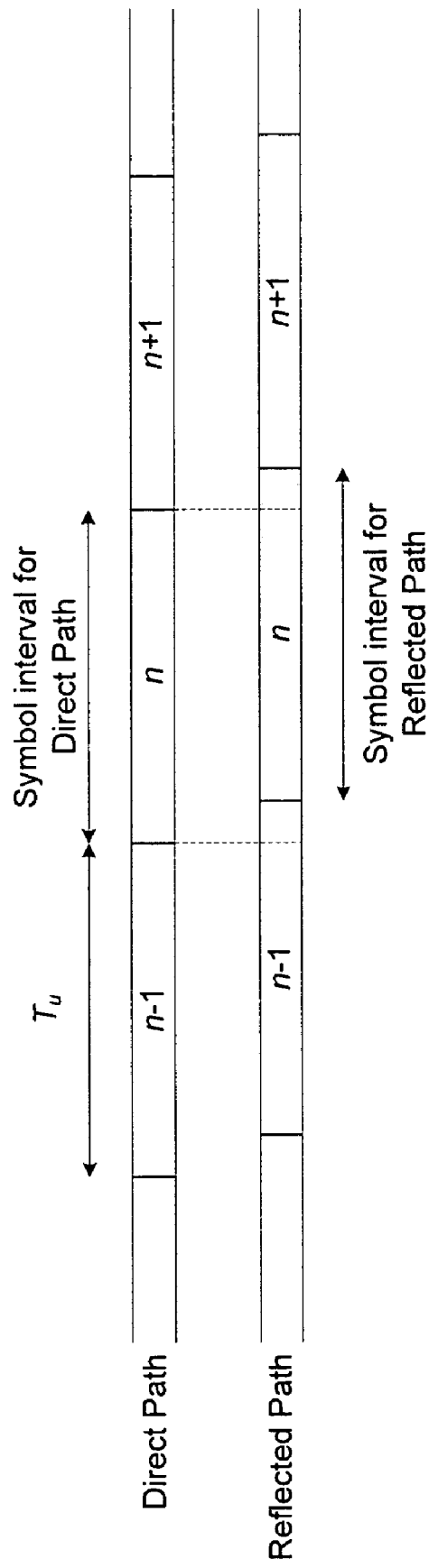
FIG. 2 illustrates the effect of time dispersion on the orthogonality of the subcarriers in an OFDM system.
Figure 3:
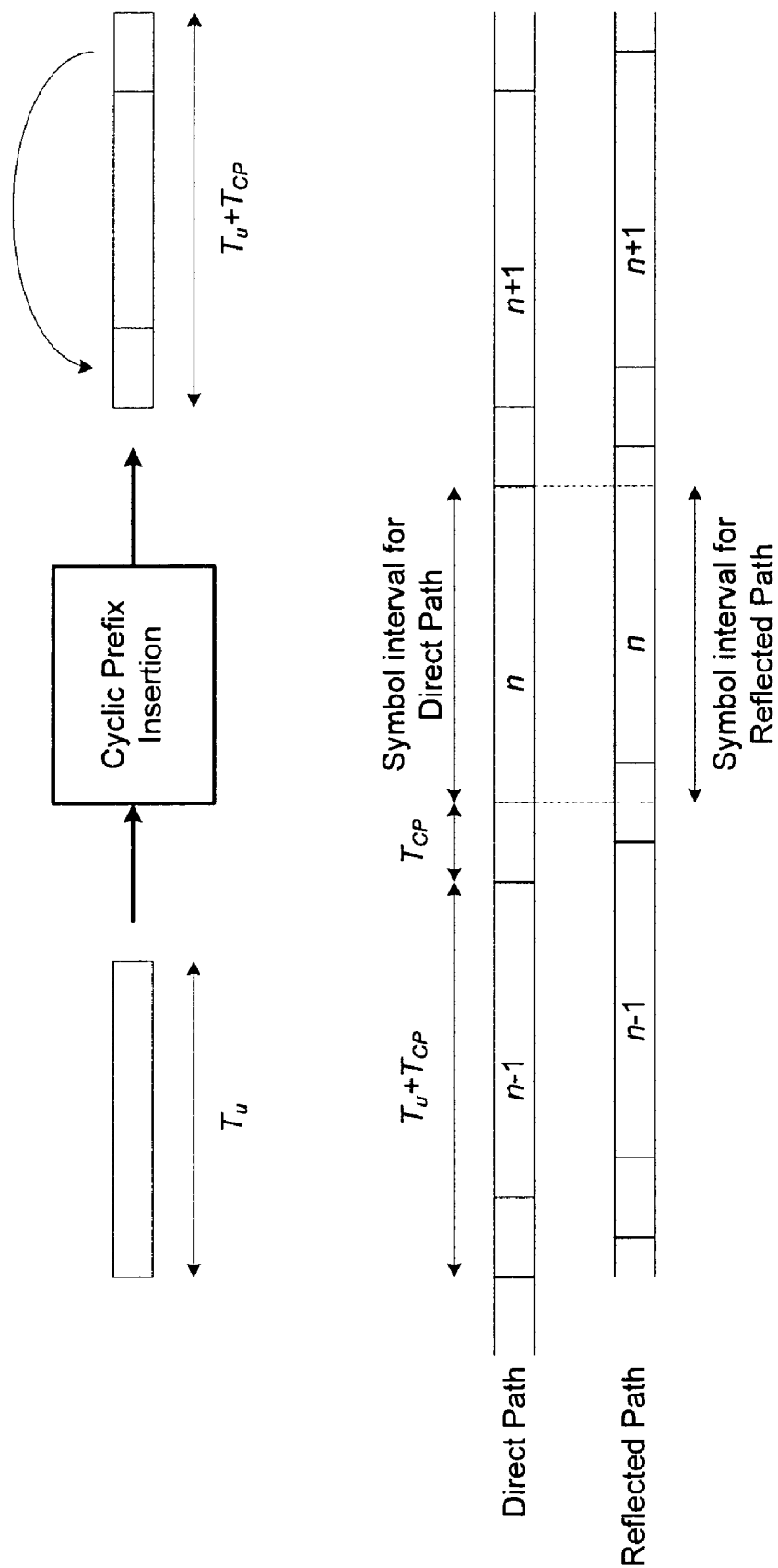
FIG. 3 illustrates how cyclic prefix can help maintain the orthogonality of the subcarriers in an OFDM system.
Figure 4:
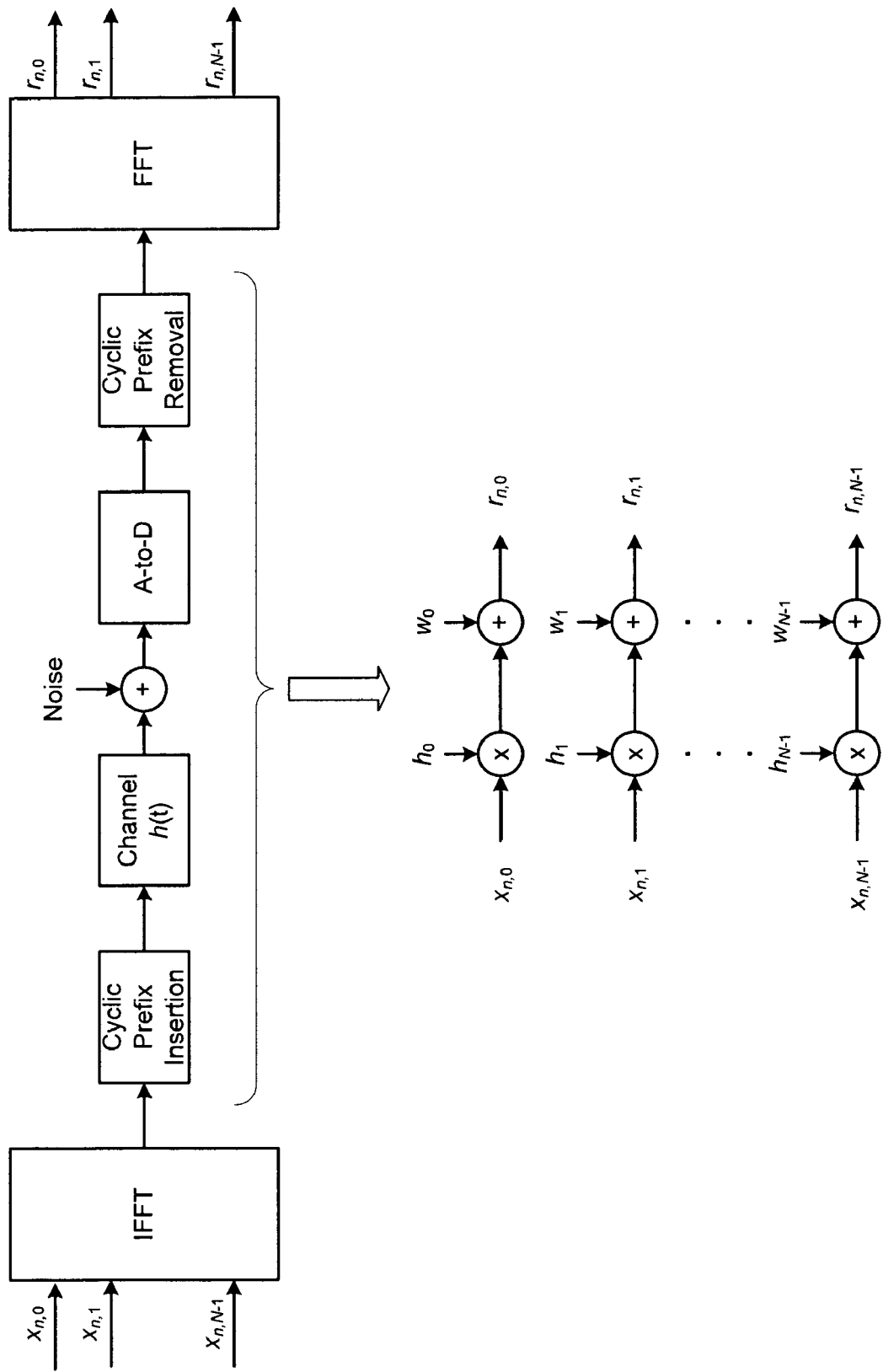
FIG. 4 illustrates a time domain and frequency domain model of an OFDM system.
Figure 5:
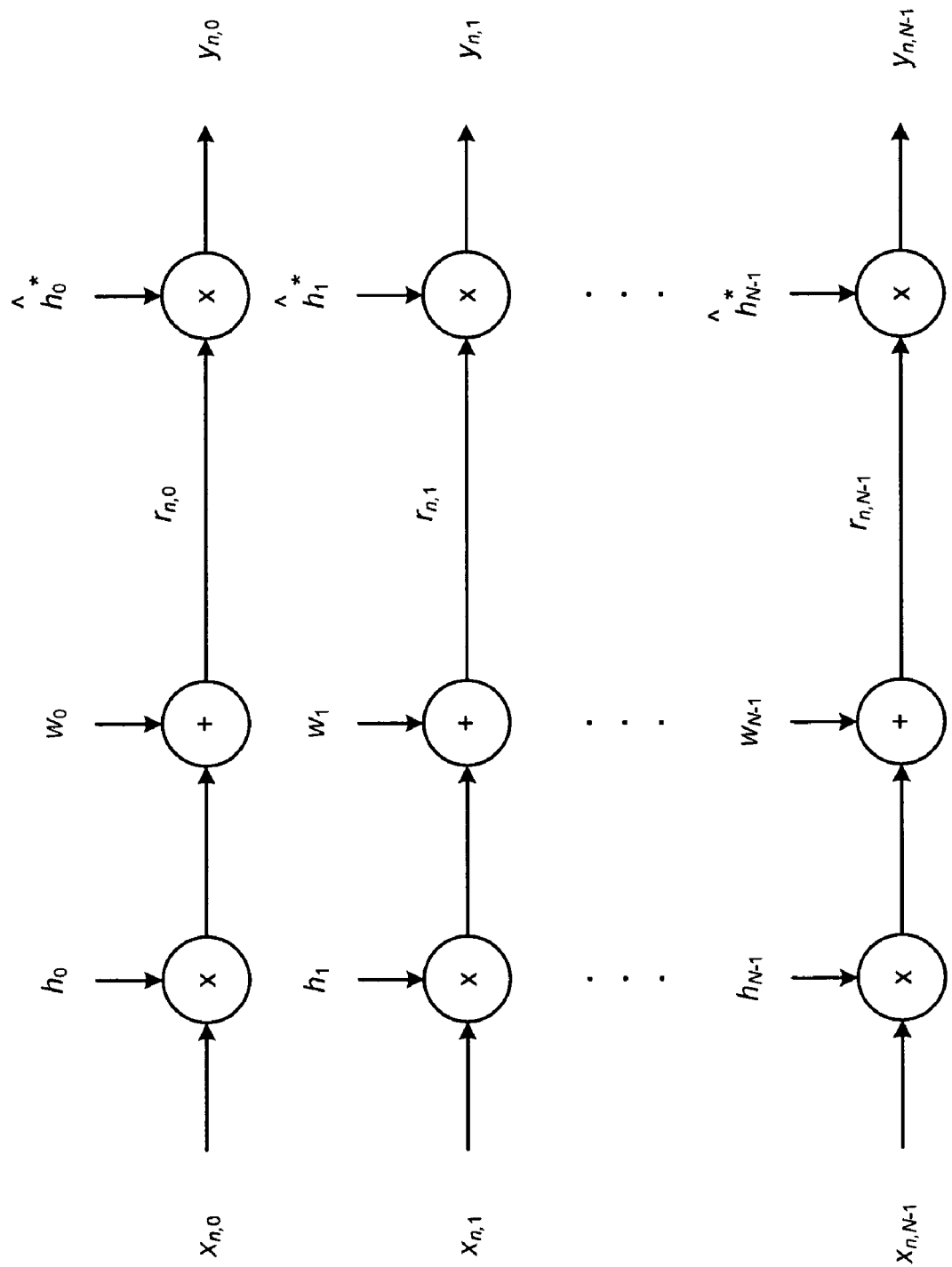
FIG. 5 illustrates the frequency domain model of the OFDM system and the equalization at the receiver.
Figure 6:
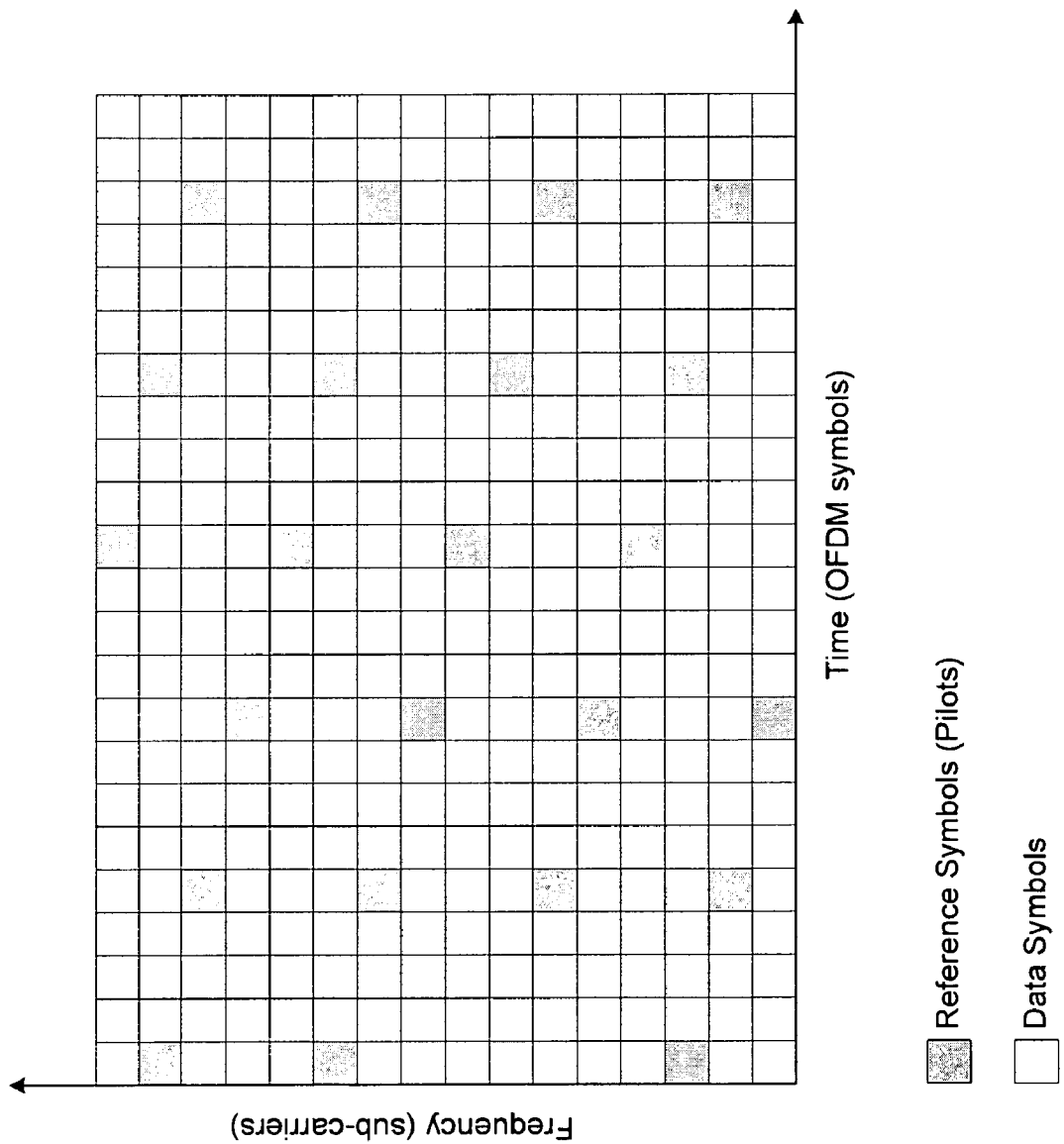
FIG. 6 illustrates an example arrangement of data and reference symbols in a time-frequency grid representation of an OFDM system.

The foregoing aspects, features and advantages of the present invention will be further appreciated when considered with reference to the following description of preferred embodiments and accompanying drawings, wherein like reference numerals represent like elements. In describing the preferred embodiments of the invention illustrated in the appended drawings, specific terminology will be used for the sake of clarity. However, the invention is not intended to be limited to the specific terms used.

In OFDM systems, each OFDM symbol includes a large number of subcarriers that are individually modulated. The subcarriers that carry payload data are referred herein as data subcarriers and the subcarriers that carry reference symbols are referred herein as pilot subcarriers. The position and density of pilots in the time-frequency grid may vary depending on the application and the particular OFDM system under consideration. In a given OFDM system, the position of pilot subcarriers may vary, often in a periodic manner, as a function of the OFDM symbol.

To demodulate the received data symbol on each subcarrier of an OFDM symbol, channel estimation is employed for each of these subcarriers. The channel estimate for one or more of the data subcarriers in the current OFDM symbol may be obtained through pilots in the current OFDM symbol or through previously received pilots and demodulated data symbols. The channel estimate for a given data subcarrier is used to equalize and demodulate the received symbol on given data subcarrier.

According to one aspect of the present invention, the demodulated data symbols from current OFDM symbol are used as reference symbols and incorporated into the channel estimation process for the remaining data subcarriers in the current OFDM symbol. The demodulated data symbols from current OFDM symbol may be used in addition to any pilots from past and/or current and/or future OFDM symbols and demodulated data symbols from past OFDM symbols. As additional received symbols on data subcarriers of current OFDM symbol are demodulated, the demodulated data symbols become available as additional reference symbols for estimating the channel for the remaining data subcarriers in the current OFDM symbol. All the reference symbols, e.g., demodulated data symbols from past OFDM symbols, pilots from past and/or current and/or future OFDM symbols, and demodulated data symbols from current OFDM symbol may be used in conjunction with each other to produce the channel estimate for the remaining data subcarriers in the current OFDM symbol.

The channel estimation and data demodulation may be used in a joint manner to improve the channel estimation performance. The improved channel estimation in turn helps improve the data demodulation of the next data subcarrier within the current OFDM symbol. This adaptive process may be continued until all the data symbols in the current OFDM symbol are demodulated.

The inclusion of demodulated data symbols from current OFDM symbol as reference symbols for estimating the channel for the remaining data subcarriers in the current OFDM symbol may be applied to the traditional channel estimation techniques such as MMSE, DFE and others.

To illustrate one application of the invention, an exemplary channel estimation method is chosen, in particular a separable 2D filtering method. For this example, 1D MMSE channel estimation is performed along the time axis first to generate channel estimates at pilot subcarrier positions from previous OFDM symbols. These time adapted pilot channel estimates are then used to perform 1D MMSE channel estimation along the frequency axis. According to one aspect of the present invention, the MMSE channel estimation along the frequency axis may incorporate the demodulated data symbols from data subcarriers in addition to the pilot channel estimates for the current OFDM symbol.

The initial channel estimates based on individual reference symbol may be obtained by a Least Squares method. For a one tap frequency domain equalizer in an OFDM system, the Least Squares channel estimates may be obtained by dividing the received data symbol with the known value of the transmitted symbol.

A process followed by the new adaptive method to perform joint channel estimation and demodulation is described below. The following notational convention is used in the description below. Some signal names are designated with two subscripts separated by a comma. The first subscript indicates the OFDM symbol index while the second subscript refers to the subcarrier index within an OFDM symbol. A caret over a signal name indicates an estimated value which in general will be different from the true value. The process is discussed below with regard to FIG. 10.

As shown in step 100, a channel estimate may be performed for the pilot subcarriers of current OFDM symbol n by dividing the received value $r_{n,p}$ on the pilot subcarrier positions $\{p\}$ with the known transmitted modulation data symbol $x_{n,p}$. This may be a Least Squares estimate. Specifically, $$\hat{h}_{n,p} = \frac{r_{n,p}}{x_{n,p}}$$

These channel estimates $\hat{h}_{n,p}$ are the initial known channel estimates for the 1D filtering along the frequency dimension.

Next, at step S102, 1D filtering is preferably performed in the time dimension to obtain the channel estimate $\hat{h}_{n,p}$ for subcarriers at pilot positions $\{p\}$ in the current OFDM symbol n using the channel estimates from past OFDM symbols n-1, n-2, n-$L_t$, where $L_t$ is the number of past OFDM symbols used for performing 1D filtering. Specifically, $$\hat{h}_{n,p} = \sum_{t=1}^{L_t} C_{t,p} \hat{h}_{t,p}$$

Here $C_{t,p}$ are the coefficients for the 1D filtering along time axis obtained using MMSE criteria.

As shown in step S104, using all the known channel estimates so far, the channel estimate $\hat{h}_{n,d}$ of the next selected data subcarrier d may be performed within the current OFDM symbol n. Specifically, $$\hat{h}_{n,d} = \sum_{j=1}^{L_{f,d}} C_{f,j} \hat{h}_{n,j}$$

Here $C_{f,j}$ are the coefficients for the 1D filtering along frequency axis obtained using MMSE criteria. The number of available known channel estimates $L_{f,d}$ for filtering may vary depending on the position and the order of the subcarrier in which the channel estimation and demodulation are performed. While step S104 shows that all known channel estimates may be used, this is not required. The number of estimates (e.g., $L_f$ or $L_t$) may be chosen to achieve optimum performance.

Then at step S106, the data symbol received on a selected data subcarrier may be equalized using the channel estimate computed in step S104. Specifically, the received equalized data symbol $y_{n,d}$ is equal to the complex conjugate of the channel estimate multiplied by the output of the $d^{th}$ subcarrier $$y_{n,d} = \hat{h}^*_{n,d} r_{n,d}$$

As shown in step S108 the received equalized data symbol $y_{n,d}$ may be demodulated and the transmitted symbol on the selected data subcarrier may be estimated. The demodulated data symbol $\hat{x}_{n,d}$ is the estimate of the transmitted symbol $x_{n,d}$ at OFDM symbol n at subcarrier position d.

Then at step S110, the channel estimate $\hat{h}_{n,d}$ obtained in step S104 may be adapted on the selected data subcarrier using the demodulated information obtained in step S108 by performing a channel estimate, such as a Least Squares channel estimate, for the selected data subcarrier of the current OFDM symbol n since the modulation information is now known. Specifically, $$\hat{h}_{n,d} = \frac{r_{n,d}}{\hat{x}_{n,d}}$$

The adapted channel estimate of the selected data subcarrier along with the other previously known channel estimates becomes the basis to perform the channel estimation of the next data subcarrier within the same OFDM symbol n.

A determination is made at step S112 as to whether all of the data subcarriers have been processed. If they have not all been processed, then the process returns to step S104 and the process is repeated for all data subcarriers within the current OFDM symbol n. Otherwise, the process may terminate at step S114. Among the channel estimates for the available demodulated data subcarriers, some or all may be used for the channel estimation of the remaining data subcarriers in the current OFDM symbol.

Traditional channel estimation algorithms for OFDM systems may use the pilot subcarriers from current and past OFDM symbols and/or may use the past demodulated data symbols as reference symbols to perform channel estimation for subcarriers of the current OFDM symbol.

When the number of subcarriers in an OFDM symbol is large, the subcarriers are typically organized into smaller subsets. Only the subcarriers belonging to each sub-set are relevant for channel estimation of that sub-set because the channel correlation along the frequency axis may be strong only among subcarriers that are close to each other.

Figure 10:
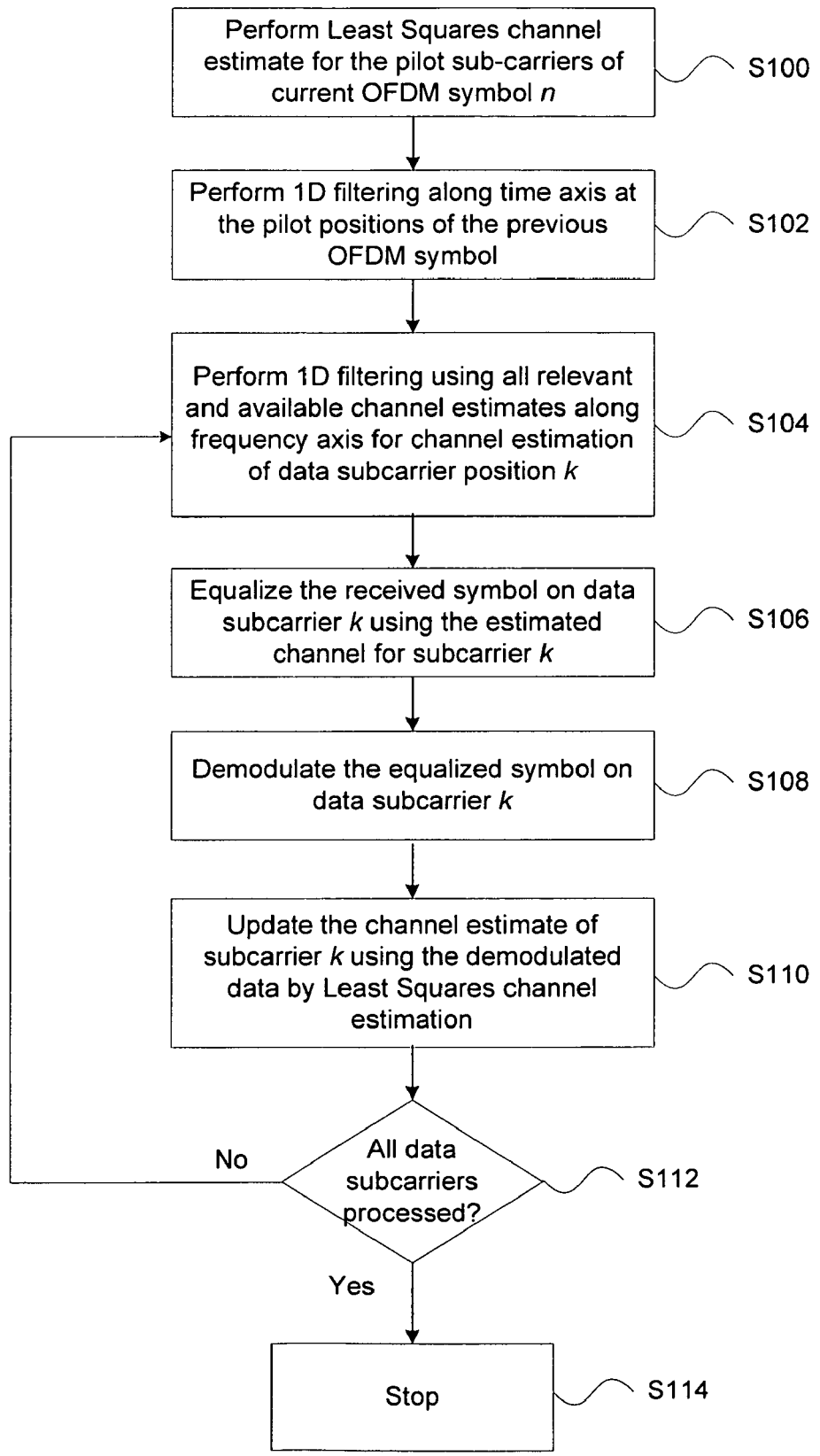
FIG. 10 is a flowchart of an adaptive channel estimation method presented in accordance with aspects of the present invention.

In accordance with aspects of the present invention, the channel estimation method of FIG. 10 may be applied to various wireless communications systems such as an IEEE 802.16e based wireless communication system. While examples are provided with reference to an IEEE 802.16e-type system, aspects of the present invention may be applied to all types of OFDM communications systems and the like, such as IEEE 802.11, IEEE 802.20, T-DMB, DVB-T, DVB-H, MediaFLO and Long Term Evolution of 3G-type systems.

Figure 11:
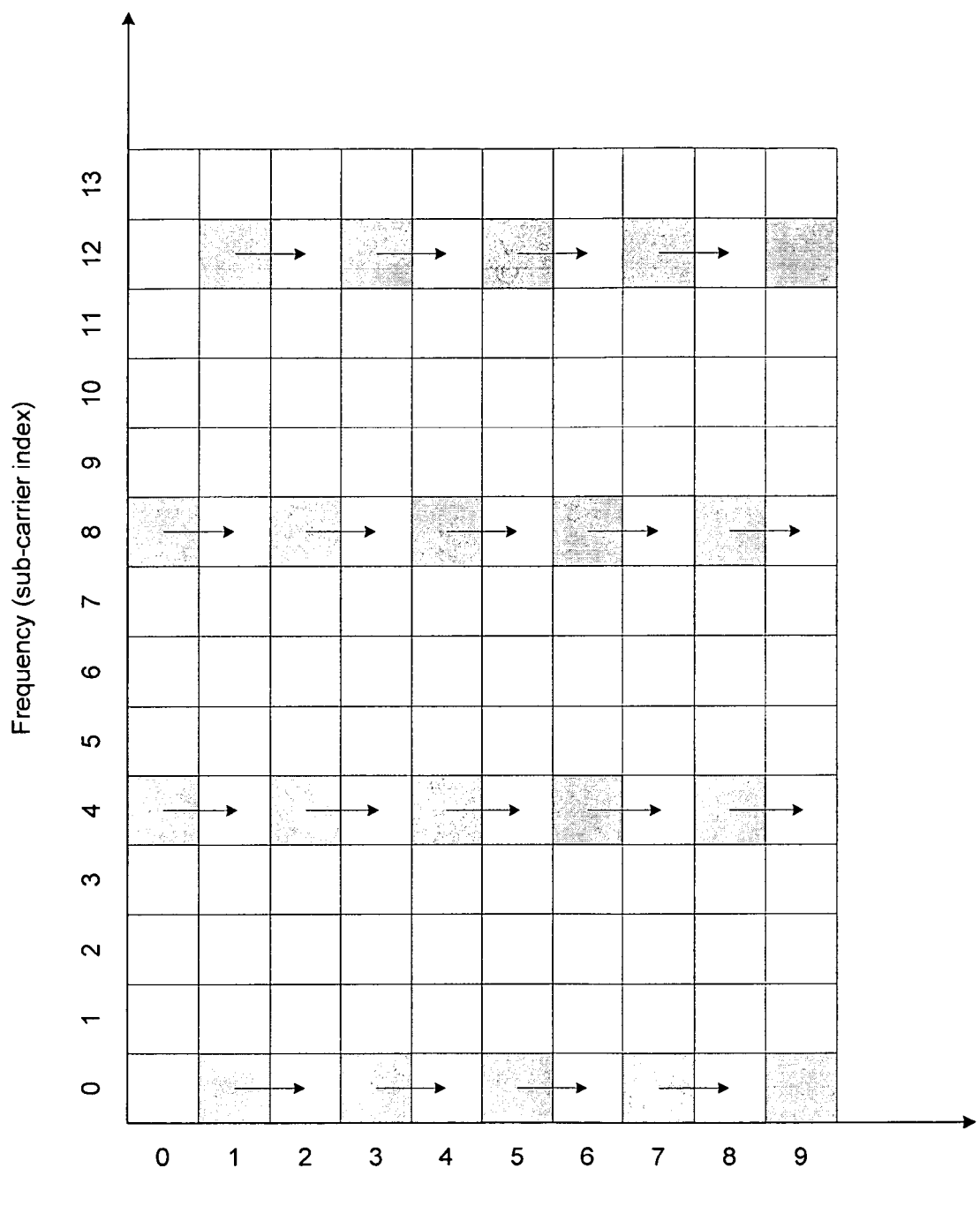
FIG. 11 illustrates cluster structure in PUSC mode of operation for IEEE 802.16e based OFDM system.

In an IEEE 802.16e based system, the total number of subcarriers in an OFDM symbol may be 2048, 1024, 512, or 128. In such a system, the subcarriers may be grouped in different manner depending on different operating modes. In the Partial Usage of Sub Carriers (PUSC) mode of operation, 14 subcarriers may be grouped as a subset which is called a cluster. There are two subcarriers allocated for pilots in a cluster. The position of the pilot subcarriers varies depending on whether the OFDM symbol is even numbered or odd numbered as shown in FIG. 11.

In an IEEE 802.16e scenario, a first Least Squares channel estimate may be performed at the two pilot subcarrier positions within a given cluster of the current OFDM symbol. Next, the 1D MMSE filtering along time axis may be performed to obtain the channel estimates in a given cluster for the current OFDM symbol at the pilot positions for the same cluster of the previous OFDM symbol as shown in FIG. 11. After the channel estimates at the four subcarrier positions become available, 1D MMSE filtering along the frequency axis may be performed according to the exemplary joint channel estimation and data demodulation process described above.

For the first OFDM symbol there may not be any previous OFDM symbol which may be needed for 1D MMSE filtering along the time axis. There are different ways to handle such initial conditions. For example, there may be channel estimates from training OFDM symbols that may precede the data OFDM symbol which may be used. Alternatively, 1D MMSE filtering along the frequency axis for the first OFDM symbol may be started with only two pilots per cluster.

The order in which the data subcarriers are processed can affect the performance of the channel estimation and the demodulation. Another aspect of the present invention is that the data subcarrier for which channel estimation is to be performed may be chosen such that it may be surrounded by pilot subcarriers of the current OFDM symbol or it may be closest to the pilot subcarrier of the current OFDM symbol. For example, selecting the subcarrier number 6 first in a cluster has the advantage that it is surrounded by two pilot subcarrier positions at equal distance on both sides. Similar considerations are used in selection of subsequent data subcarriers for processing.

With the available channel estimates for four subcarrier positions 0, 4, 8, and 12, a method in accordance with aspects of the invention first performs channel estimation for the data subcarrier 6. The channel estimate of subcarrier 6 is then used to equalize the data symbol received on subcarrier 6. Next the data symbol on subcarrier 6 is demodulated. The demodulated data symbol is then used to adapt the estimated channel for the same subcarrier 6 through Least Squares estimation. Now the channel estimates for five subcarrier positions are available, namely 0, 4, 6, 8, and 12 for the present cluster of the current OFDM symbol. These estimates are used to perform the channel estimation of the next subcarrier of the same cluster in the current OFDM symbol.

Next subcarrier 5 may be selected to perform channel estimation, equalization and demodulation. The demodulated data symbol from subcarrier 5 is then used to adapt the channel estimate for subcarrier 5. Now channel estimates for six subcarrier positions are available, namely 0, 4, 5, 6, 8, and 12 for the present cluster of the OFDM symbol n. These estimates are used to perform the channel estimation of the next subcarrier of the same cluster in OFDM symbol n.

Next subcarrier 7 may be selected to perform channel estimation, equalization and demodulation. The demodulated data symbol from subcarrier 7 is then used to adapt the channel estimate for subcarrier 7. Now the channel estimates for seven subcarrier positions are available, namely 0, 4, 5, 6, 7, 8, and 12 for the present cluster of the OFDM symbol n. These estimates are used to perform the channel estimation of the next subcarrier of the same cluster in OFDM symbol n.

The above process may be carried out until all the subcarriers are demodulated in a cluster. The same procedure may be repeated for all the remaining clusters in an OFDM symbol. For each cluster in the present example, there are four subcarrier channel estimates available to start with and the available subcarrier channel estimates are increased by one after each subcarrier is processed. This leads to improved channel estimation and improved demodulation as each subcarrier is processed within each cluster. FIG. 12 presents a table illustrating cluster processing in such an example.

The channel phase and amplitude may vary in both time and frequency due to time and frequency selective nature of some of the channels. Therefore, the channel estimate for one subcarrier may be different from the channel estimate for another subcarrier. Another aspect of the invention is that the demodulated data symbols that are received on subcarriers that are experiencing a fade at any given OFDM symbol may be deemphasized from the adaptive channel estimation process. For instance, this may be accomplished via selection of appropriate filter coefficients.

The above example illustrated the new adaptive channel estimation method for a cluster in an OFDM symbol. However, the same method can be applied to all the subcarriers in an OFDM symbol. The method is not dependent on the pattern of the data and pilot subcarriers in OFDM symbols. Hence this innovative method may be applied to any OFDM systems with or without pilot subcarriers.

The above example illustrated the incorporation of the invention in a 1D MMSE filtering method of channel estimation. Aspects of the present invention may be incorporated in a 2D MMSE, or other traditional channel estimation methods by appropriate modification as required for the application.

Figure 7:
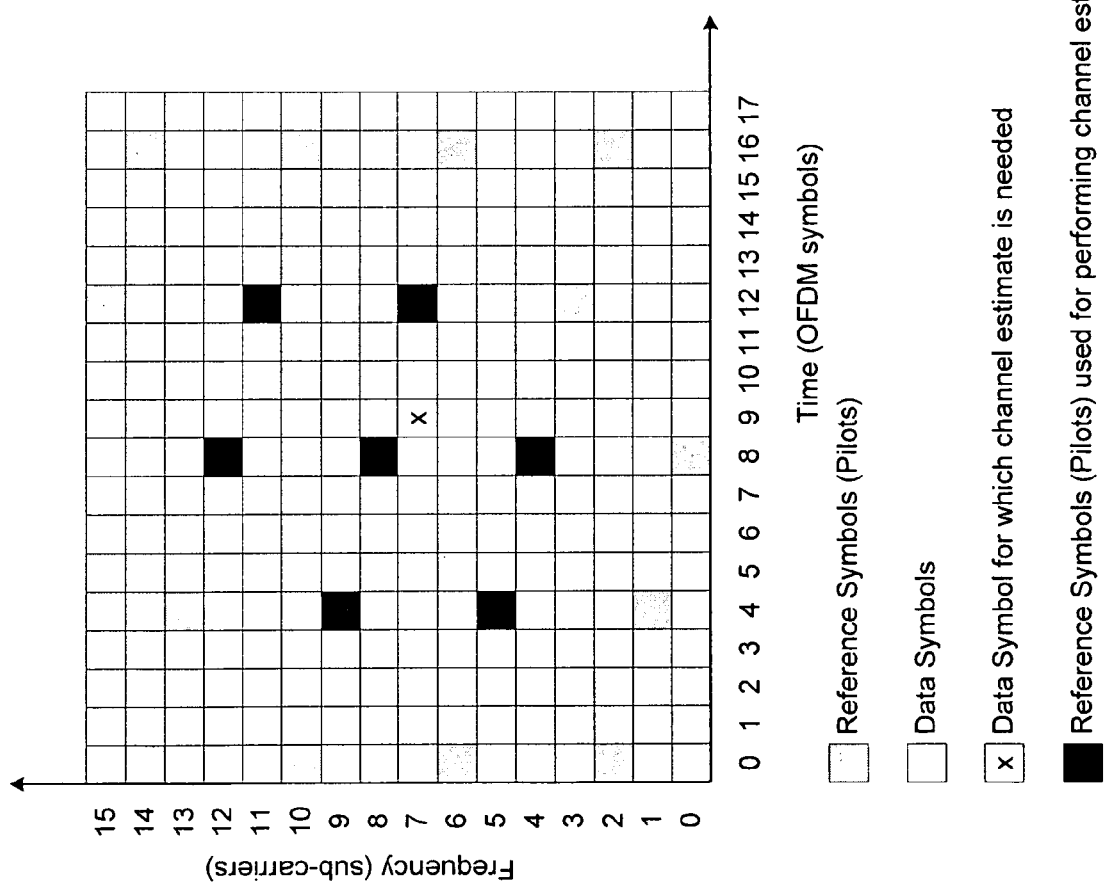
FIG. 7 illustrates 2D channel estimation in a time-frequency grid for an OFDM system.
Figure 8:
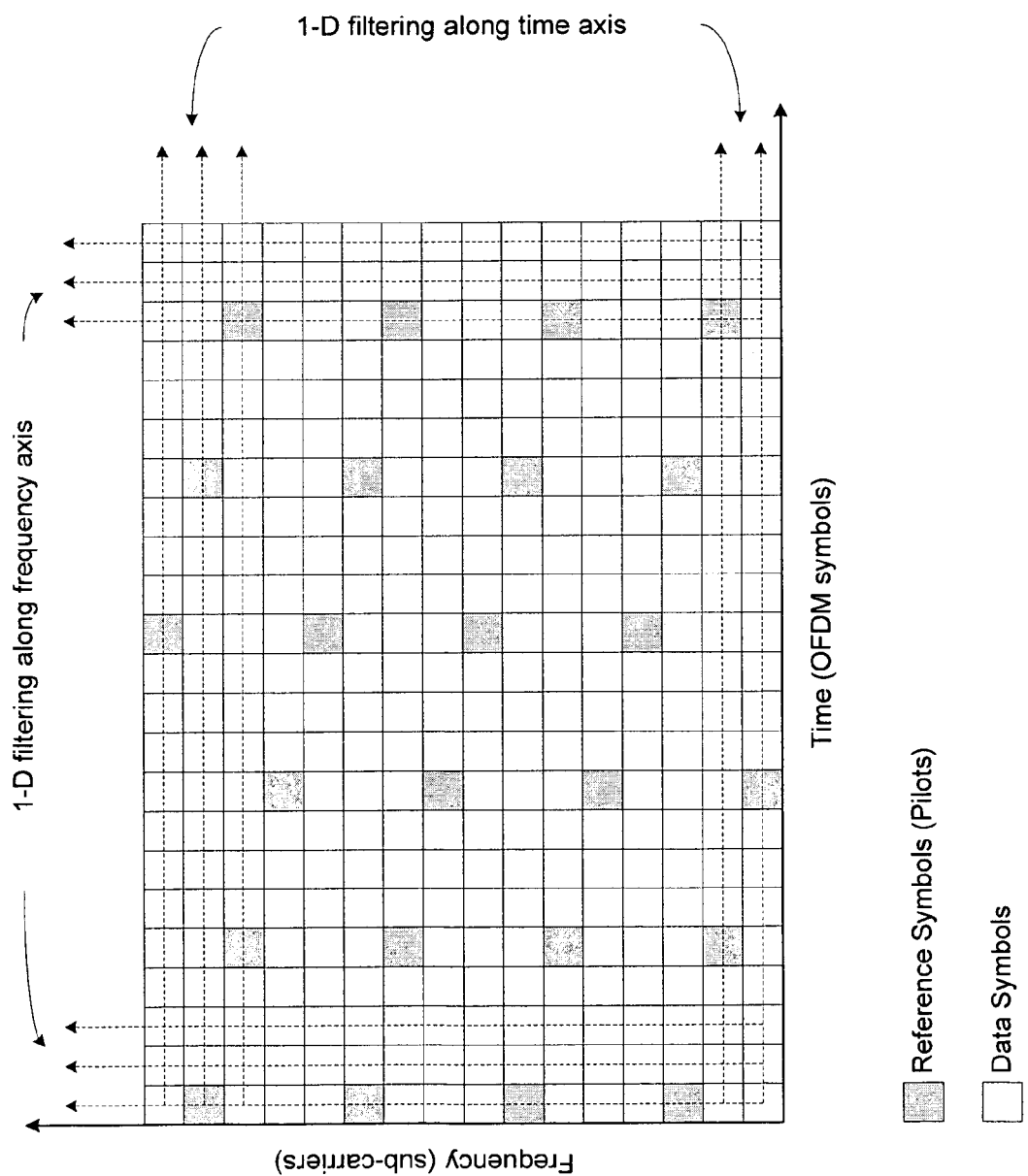
FIG. 8 illustrates separable 2D channel estimation with 1D filtering along time axis and 1D filtering along frequency axis in a time-frequency grid for an OFDM system.
Figure 9:
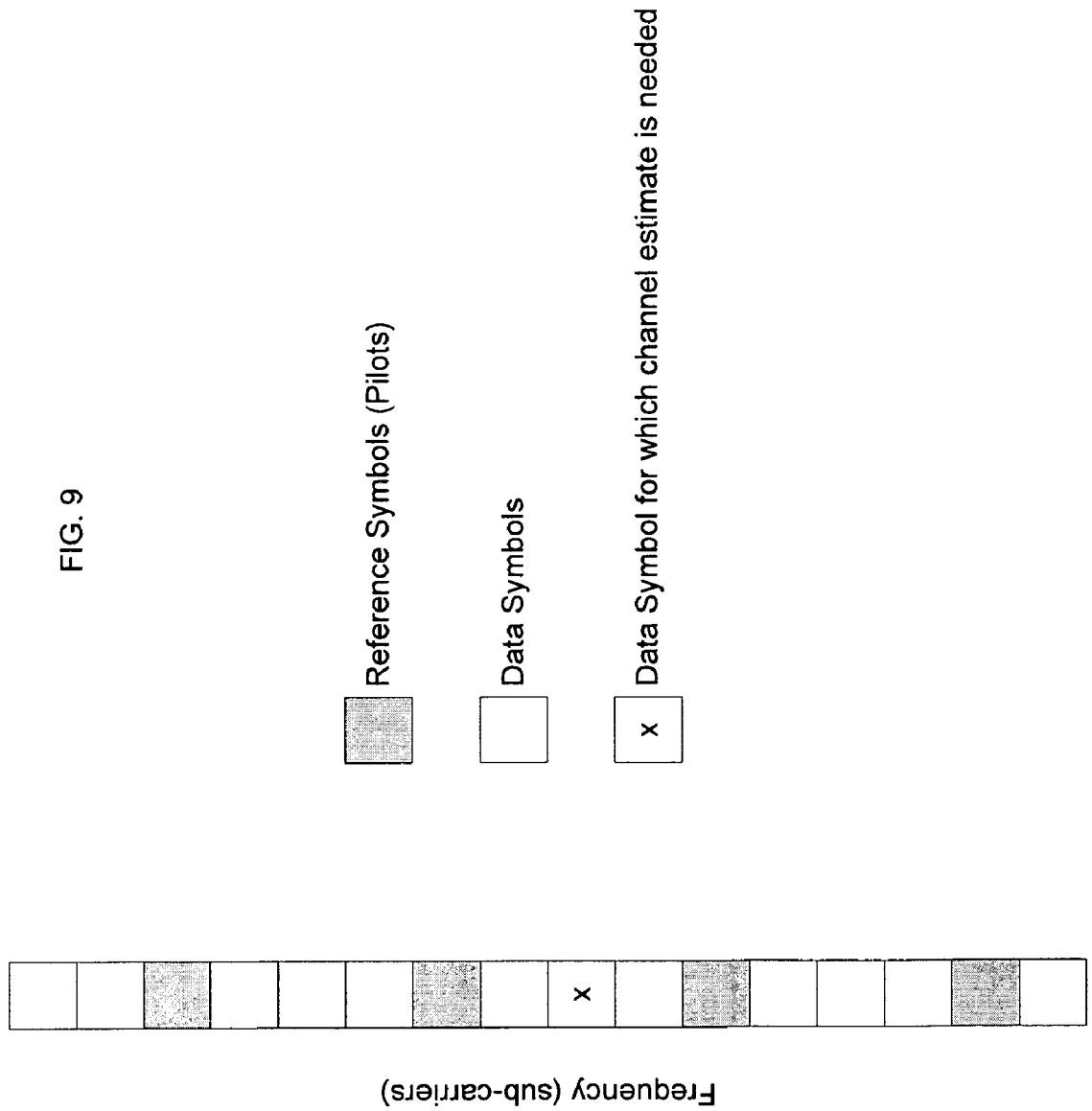
FIG. 9 illustrates 1D filtering for channel estimation along frequency axis for an OFDM system.
Figure 13:
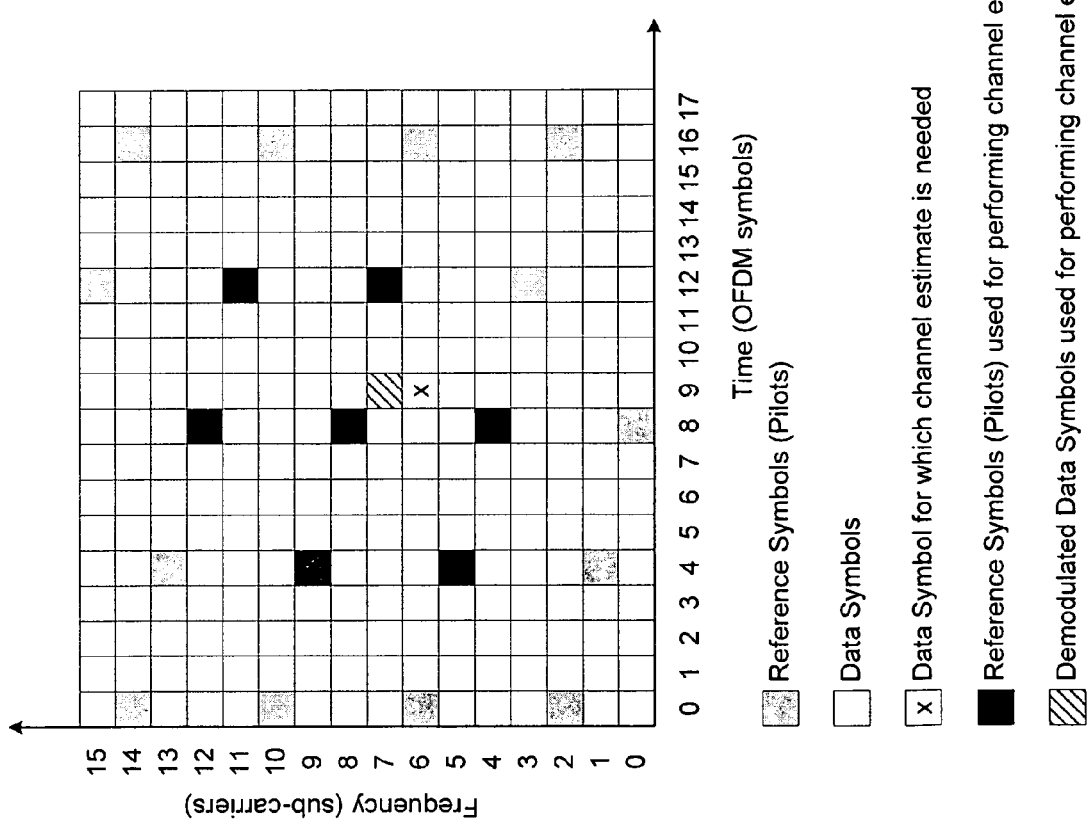
FIG. 13 illustrates 2D channel estimation in a time-frequency grid for an OFDM system in accordance with aspects of the present invention.

By way of example only, the methods described herein may be employed with a scenario such as set forth with reference to FIG. 7. Application of one such method for 2D channel estimation is described with reference to FIG. 13. Here, the channel estimate at position (9, 7) may be used to equalize and demodulate the received data symbol at position (9, 7). This demodulated symbol in turn may be used to update the channel estimate at position (9, 7) by using the Least Squares method. During the channel estimation for another position, say (9, 6), the updated channel estimate at position (9, 7) is used along with the channel estimates at pilot positions set indicated by Set_1 as shown in FIG. 13. The set of positions at which channel estimates are available is given as follows:

$$Set\_2=\{(4,5),(4,9),(8,4),(8,8),(8,12),(12,7),(12,11),(9,7)\}$$

The length of the filter for channel estimation at position (9, 6) is longer by one compared to the length of the filter for channel estimation at position (9, 7). This process is continued till sufficient symbols are demodulated and updated channel estimates are available for estimating channel at other positions. The filter length grows by one for every additional channel estimate that is included in the channel estimation at other positions.

Some of the advantages and benefits of the methods described herein include performing channel estimation, equalization and demodulation in a "joint" manner for the OFDM symbol that is being processed, as well as reducing the influence of the channel estimates from the past OFDM symbols. The procedures presented in accordance with the invention enable more accurate channel estimation when compared to conventional operation, which in turn leads to improved data demodulation. The improved data demodulation reduces the error rate at the receiver and this in turn improves the data throughput and may reduce the number of retransmissions and may reduce the power consumption. Furthermore, by incorporating the data symbols demodulated in current OFDM symbol, channel variations from one OFDM symbol may be quickly incorporated into to the channel estimation of new OFDM symbols. This leads to a significant advantage for handling fast varying channel conditions in mobile environments.

The adaptive channel estimation and data demodulation in accordance with aspects of the present invention improves the overall receiver performance in an OFDM or multi-carrier based digital communication systems.

Figure 14:
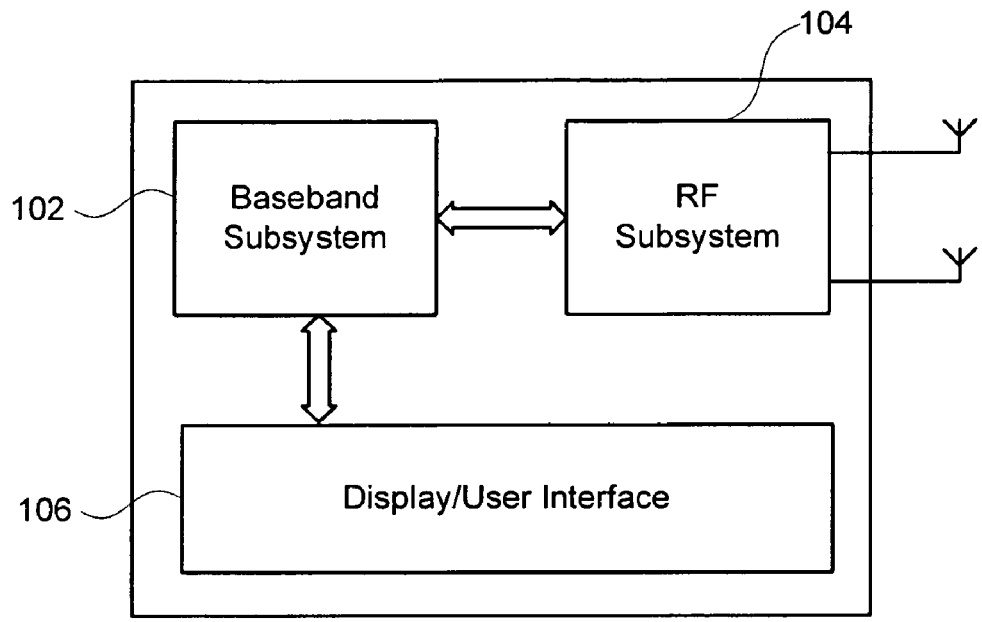
FIG. 14 illustrates a diagram of a wireless mobile station for use with aspects of the present invention.
Figure 15:
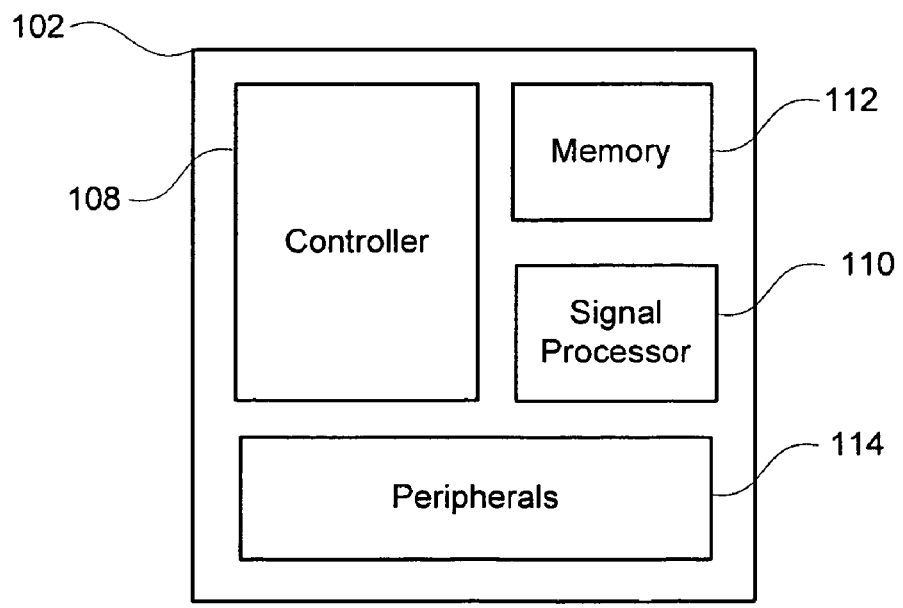
FIG. 15 illustrates a baseband subsystem for use with aspects of the present invention.

By way of example only, the above-described processes may be implemented in a user device such as a wireless mobile station ("MS") implementing OFDM. As shown in FIG. 14, MS 100 may include a baseband subsystem 102 and a radio frequency ("RF") subsystem 104. A display/user interface 106 provides information to and receives input from the user. By way of example, the user interface may include one or more actuators, a speaker and a microphone.

The baseband subsystem 102 may include a controller 108 such as a microcontroller or other processor. The controller 108 desirably handles overall operation of the MS 100, including management of the RF subsystem 104. This may be done by software or firmware running on the controller 108. Such software/firmware may embody any methods in accordance with aspects of the present invention.

A signal processor 110 may be used to process samples from the RF subsystem 104 or other information sent or received by the MS 100. The signal processor 110 may be a stand-alone component or may be part of the controller 108. Memory 112 may be shared by or reserved solely for one or both of the controller 108 and the signal processor 110. For instance, signal processing algorithms may be stored in a non-volatile section of memory 112 while coefficients and other data parameters may be stored in RAM. Peripherals 114 such as a full or partial keyboard, video or still image display, audio interface, etc may be employed and managed through the controller 108.

The RF subsystem 104 preferably provides two-way communication operation. It may include one or more receivers/receive chains, a transmitter, a synthesizer, a power amplifier, and one or more antennas operatively coupled together to enable OFDM or similar communication. The receive chain(s) is operable to receive signals from one or more channels in a wireless communication network. Aspects of the present invention may be implemented in firmware of the signal processor 110 and/or the controller 108 of the baseband subsystem. In another alternative, aspects of the present invention may also be implemented as a combination of firmware and hardware of the baseband subsystem.

In another alternative, aspects of the present invention may be implemented in network elements in addition to or distinct from implementation in mobile stations. For instance, one or more base stations of a wireless communication network, such as an OFDM-based wireless network, may employ a baseband subsystem and/or an RF subsystem such as those detailed above. Software and/or firmware embodying any of the methods in accordance with aspects of the present invention may be executed by a controller or signal processor of the baseband subsystem or the RF subsystem. In another alternative, aspects of the present invention may also be implemented as a combination of firmware and hardware of the baseband subsystem.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A channel estimation and data demodulation method for use in a wireless communication system, the method comprising:
   performing a first channel estimate for pilot subcarriers of a current symbol;
   performing filtering along a time dimension to obtain the channel estimate for the pilot subcarriers using channel estimates at pilot positions of one or more past symbols;
   performing filtering along a frequency dimension to obtain a second channel estimate for a data symbol of a selected data subcarrier using known channel estimates;
   equalizing the data symbol of the selected data subcarrier;
   demodulating the equalized data symbol to estimate a transmitted symbol on the selected data subcarrier; and
   adapting the second channel estimate on the selected data subcarrier using the estimated transmitted symbol so that the adapted channel estimate and any other previously known channel estimates form a basis to perform channel estimation of a next data subcarrier.

2. The method of claim 1, wherein the current and past symbols are OFDM symbols.

3. The method of claim 1, wherein performing the first channel estimate is done by dividing a received value $r_{n,p}$ on a pilot subcarrier position $\{p\}$ with a known transmitted modulation data symbol $x_{n,p}$.

4. The method of claim 3, wherein the first channel estimate is performed with a least squares estimate $\hat{h}_{n,p}$ according to the following equation:

$$\hat{h}_{n,p} = \frac{r_{n,p}}{x_{n,p}}.$$

5. The method of claim 1, wherein the filtering along the time dimension obtains the channel estimates at the pilot positions according to the following equation:

$$\hat{h}_{n,p} = \sum_{t=1}^{L_t} C_{t,p} \hat{h}_{t,p}$$

wherein p represents pilot position, n represents a current symbol, $L_t$ represents a number of past symbols used for the one dimensional filtering action and $C_{t,p}$ are coefficients for the one dimensional filtering action in the time dimension.

6. The method of claim 1, wherein the second channel estimate is obtained according to the following equation:

$$\hat{h}_{n,d} = \sum_{j=1}^{L_{f,d}} C_{f,j} \hat{h}_{n,j}$$

wherein n represents a current symbol, $L_{f,d}$ represents a number of available known channel estimates, and $C_{f,j}$ are coefficients for filtering in the frequency dimension.

7. The method of claim 1, wherein equalizing the data symbol is performed according to the following equation:

$$y_{n,d} = \hat{h}^*_{n,d} r_{n,d}$$

wherein the received equalized data symbol $y_{n,d}$ is equal to the complex conjugate of the channel estimate multiplied by the output of the $d^{th}$ subcarrier.

8. The method of claim 1, wherein adapting the second channel estimate on the selected data subcarrier using the estimated transmitted symbol is done by performing a least squares channel estimate.

9. The method of claim 8, wherein the least squares channel estimate is performed according to the following equation:

$$\hat{h}_{n,d} = \frac{r_{n,d}}{\hat{x}_{n,d}}$$

wherein $\hat{h}_{n,d}$ is a channel estimate, $r_{n,d}$ is an output of the $d^{th}$ subcarrier, and $\hat{x}_{n,d}$ is a demodulated data symbol.

10. The method of claim 1, wherein the filtering is a two dimensional filtering action.

11. The method of claim 1, wherein the selected data subcarrier is chosen so that it is surrounded by pilot subcarriers of the current symbol.

12. A recording medium recorded with a computer program for execution by a processor to perform a channel estimation and data demodulation process in a wireless communication system, the process comprising:
  performing a first channel estimate for pilot subcarriers of a current symbol;
  performing filtering along a time dimension to obtain the channel estimate for the pilot subcarriers using channel estimates at pilot positions of one or more past symbols;
  performing filtering along a frequency dimension to obtain a second channel estimate for a data symbol of a selected data subcarrier using known channel estimates;
  equalizing the data symbol of the selected data subcarrier;
  demodulating the equalized data symbol to estimate a transmitted symbol on the selected data subcarrier; and
  adapting the second channel estimate on the selected data subcarrier using the estimated transmitted symbol so that the adapted channel estimate and any other previously known channel estimates form a basis to perform channel estimation of a next data subcarrier.

13. The recording medium of claim 12, wherein the current and past symbols are OFDM symbols.

14. The recording medium of claim 12, wherein the selected data subcarrier is chosen so that it is surrounded by pilot subcarriers of the current symbol.

15. The recording medium of claim 12, wherein the filtering is a two dimensional filtering action.

16. A wireless communication device for use on a wireless communication network, the wireless communication device comprising:
  a baseband subsystem including a processor for managing operations of the wireless communication device; and
  a radio frequency subsystem operatively connected to the baseband subsystem, the radio frequency subsystem including at least one receive chain being operable to receive signals from at least one channels of the wireless communication network;
  wherein the processor is operable to:
    perform a first channel estimate for pilot subcarriers of a current symbol received by the at least one receive chain;
    perform filtering along a time dimension to obtain the channel estimate for the pilot subcarriers using channel estimates at pilot positions of one or more past symbols;
    perform filtering along a frequency dimension to obtain a second channel estimate for a data symbol of a selected data subcarrier using known channel estimates;
    equalize the data symbol of the selected data subcarrier;
    demodulate the equalized data symbol to estimate a transmitted symbol on the selected data subcarrier; and
    adapt the second channel estimate on the selected data subcarrier using the estimated transmitted symbol so that the adapted channel estimate and any other previously known channel estimates form a basis to perform channel estimation of a next data subcarrier.

17. The wireless communication device of claim 16, wherein the wireless communication network employs an OFDM modulation scheme.

18. The wireless communication device of claim 16, wherein the selected data subcarrier is chosen so that it is surrounded by pilot subcarriers of the current symbol.

19. The wireless communication device of claim 16, wherein the device is a mobile station.

20. The wireless communication device of claim 16, wherein the device is a base station of the wireless communication network.

* * * * *